US006439476B1

(12) United States Patent
Boggs

(10) Patent No.: US 6,439,476 B1
(45) Date of Patent: Aug. 27, 2002

(54) UNDERGROUND SPRINKLER HEAD COVER ASSEMBLY

(76) Inventor: Robert Boggs, 18136 Horseshoe Bay Cir., Ft. Myers, TX (US) 33912

( * ) Notice: Subject to any disclaimer, the term of this patent is extended or adjusted under 35 U.S.C. 154(b) by 0 days.

(21) Appl. No.: 09/679,795

(22) Filed: Oct. 5, 2000

(51) Int. Cl.[7] .......................... B05B 15/10; B05B 15/06; B05B 1/28; A01G 25/06

(52) U.S. Cl. ........................ 239/203; 239/201; 239/204; 239/205; 239/288.3; 239/288.5

(58) Field of Search ................................. 239/203, 201, 239/204, 205, 206, 207, 288, 288.3, 288.5, 285, 286, 287; 405/42, 36, 51

(56) References Cited

U.S. PATENT DOCUMENTS 3,709,435 A 1/1973 Sheets
3,762,642 A * 10/1973 Di Santo .................... 239/201
3,904,832 A * 9/1975 Sbicca ........................ 239/201
4,145,003 A * 3/1979 Harrison et al. ............ 239/204
4,429,832 A * 2/1984 Sheets ........................ 239/204
5,137,307 A * 8/1992 Kinsey ........................ 239/201
5,253,952 A * 10/1993 Selway ........................ 239/201
5,992,760 A * 11/1999 Kearby et al. .............. 239/205

* cited by examiner

*Primary Examiner*—Lesley D. Morris
*Assistant Examiner*—Davis Hwu
(74) *Attorney, Agent, or Firm*—Laura G. Barrow

(57) ABSTRACT

Novel devices and methods for covering underground sprinkler heads installed on golf courses and other sports fields are described. The invention, in certain aspects, comprises the use of mats for covering a sprinkler head lid and/or the above-ground or ground level portion of the underground casing for housing the sprinkler head assembly. The mats are formed of a shock absorbing material such that when a golf ball, for example, strikes the mat(s), the ball does not rebound away as severely compared to striking the rigid lid and/or above-ground casing portion directly (i.e. without the mat covering). Other embodiments including fabricating the sprinkler head lid and/or above-ground casing portions of the same shock-absorbing material.

18 Claims, 4 Drawing Sheets

UNDERGROUND SPRINKLER HEAD COVER ASSEMBLY

BACKGROUND AND SUMMARY

The present invention is directed to a device and method for covering the sprinkler head of an underground sprinkler assembly. The inventive device and method is particularly useful on golf courses having underground sprinkler systems. Currently, underground sprinkler systems comprise an underground casing that houses the sprinkler assembly. Underground sprinkler heads installed on golf courses, for example, often have attached directly to them a hard lid or cover that is typically formed of a rigid plastic material, generally the same material as the sprinkler assembly casing. During non-use, the sprinkler heads are lowered beneath the ground with only the sprinkler head lid appearing above the ground (or ground level). Some sprinkler head lids have a layer of artificial turf affixed to the upper surface of the lid for aesthetic purposes, as well.

While the sprinkler head lids are useful for protecting the sprinkler head from damage, they are often a hindrance to golfers. For example, if the golfer is unfortunate enough to drive the golf ball such that it strikes the sprinkler head lid, the ball will often rebound off of the rigid lid to a much greater degree than if the ball had stricken the ground surface directly. This can significantly affect the golfer's subsequent shot, especially if the golf ball has rebounded off the fairway into the rough. The present invention, in certain aspects, is directed to mats that can be easily secured to the sprinkler head as well as any other portion of the sprinkler assembly casing that is positioned above ground or at ground level, wherein the mat is formed of a less rigid material than that used to form the lid, preferably a shock absorbing material. Thus, when a golf ball does strike the mat, as opposed to the lid directly, the ball rebounds away from the mat to a lesser degree than if the ball had stricken the bare rigid lid directly (i.e. without the mat attached to it). Alternatively, the sprinkler head lid itself and/or the above-ground or ground level portions of the sprinkler assembly casing may be fabricated of such a less rigid.

DETAILED DESCRIPTION OF THE PREFERRED EMBODIMENT

Conventional underground sprinkler head lids are typically formed of a hard, rigid material. Thus, as discussed above, when a sports ball, such as a golf ball, for example, strikes the lid, the ball rebounds away to a greater degree than if the ball had stricken the underlying ground directly. Such an unnatural bounce can add at least an extra stroke to the golfer's score, especially if the golf ball rebounds off the fairway into the rough instead of "sticking" and/or taking a more natural roll toward the hole. For ease of explanation, the following description of the present invention will be made with reference to golf balls and golf courses. However, those of ordinary skill in the art, having the benefit of the teachings of this invention and the related art, will understand and appreciate that the present invention may also be employed with underground sprinkler head assemblies installed on other types of fields, such as baseball/softball fields, croquet lawns, and bocce ball lawns, for example, wherein a rigid sprinkler head lid can cause similar problems to players during play of their respective games.

Referring now to the figures, the present invention, in certain aspects, is designed to minimize this degree of rebound or bounce of the ball from the lid (12) by providing a mat (10) that is configured to attach to the upper surface of the lid (12) of a sprinkler head (1). The mat is (10) is formed of a material that is less rigid than the underlying lid (12), and more preferably is formed of a uniformly solid shock absorbing material such as a synthetic or natural rubber or rubber composite or a rubber-like material. When the golf ball (not shown), for example, strikes the mat(10), the mat absorbs the energy from the moving ball, and consequently, the ball rebounds off the mat to a lesser degree than if the ball had sticken the lid directly (i.e. without the mat). Thus, depending upon the material selected for fabricating mat, the degree of rebound from the mat more closely approximates the degree of rebound from the ground surface (G). Other exemplary materials for fabricating the include, but are not limited to, polyvinylchloride (PVC) foam, polyurethane foam, and other soft plastics and similar materials having cushioning or shock-absorbing properties.

Figure 1:
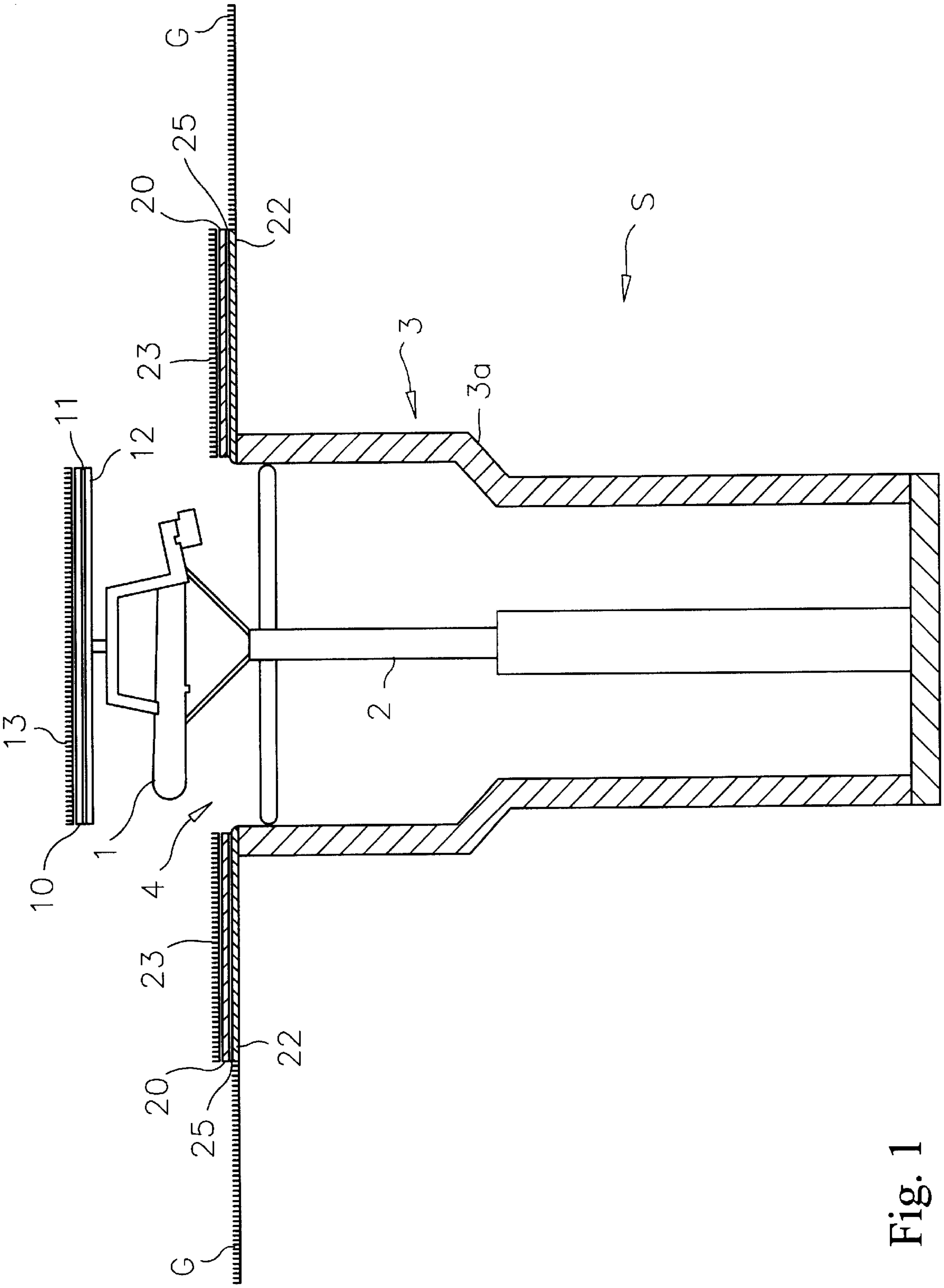
FIG. 1 is a side view of one embodiment of the present invention wherein the sprinkler head is in a raised position for irrigation operation.
Figure 2:
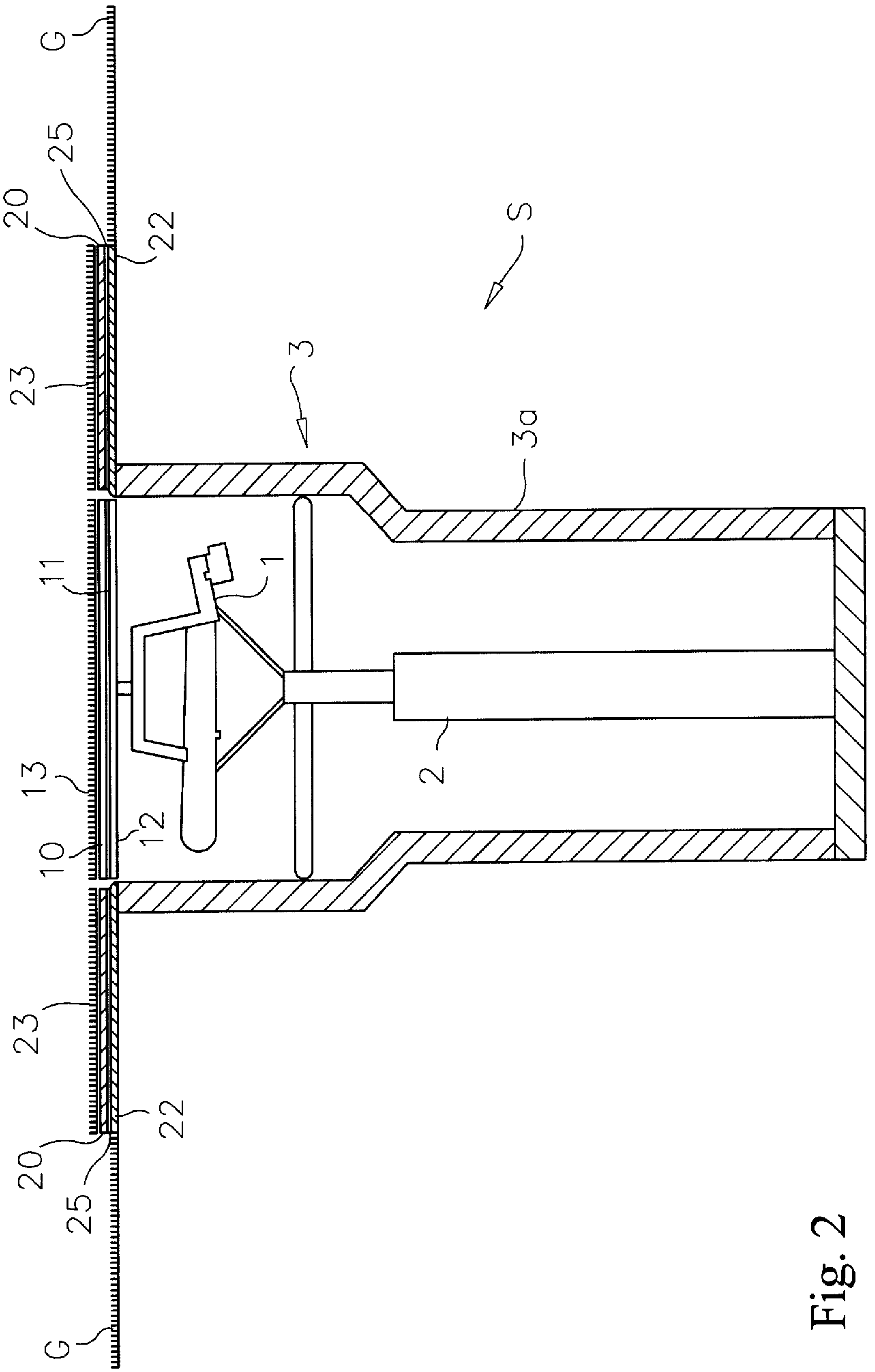
FIG. 2 is a side view of the present invention wherein the sprinkler head is in a lowered position within the underground sprinkler assembly casing.
Figure 3:
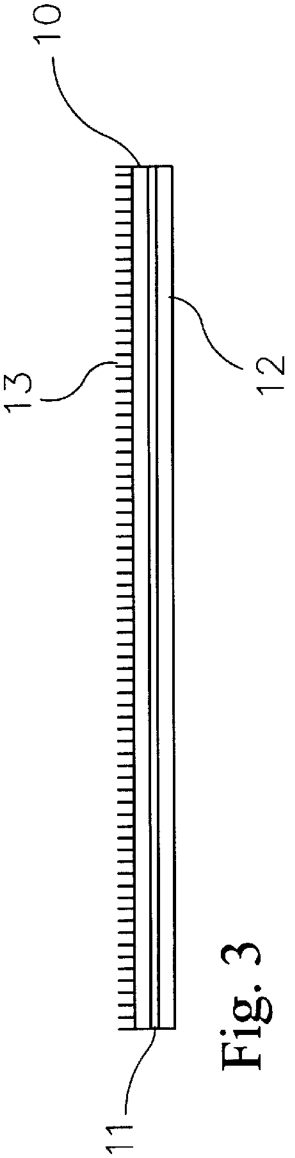
FIG. 3 is a side view of the inventive mats of one embodiment attached to a sprinkler head lid.
Figure 4:
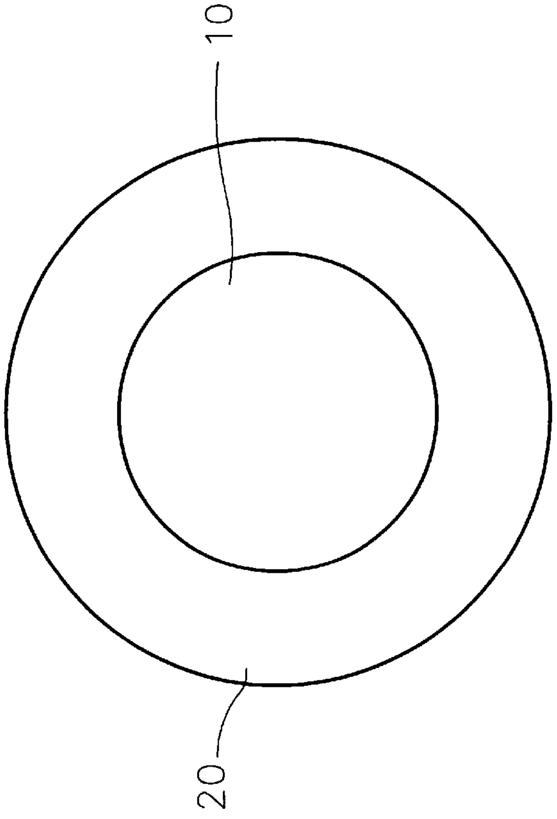
FIG. 4 is a top view of the inventive mats attached to a sprinkler head lid and casing platform.
Figure 5:
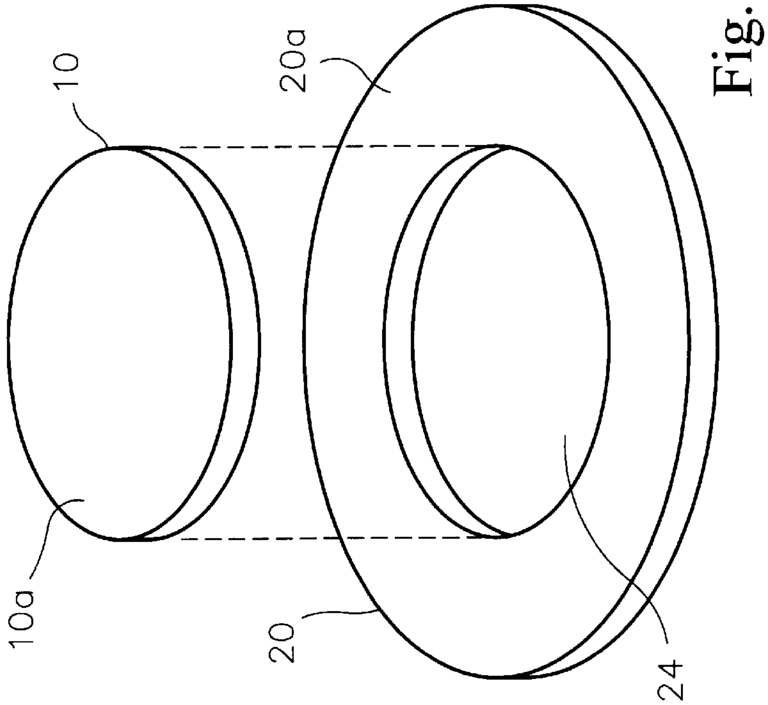
FIG. 5 is an exploded view of the mats illustrated in FIG. (without the layer of artificial grass for ease of illustration).

FIG. 1 illustrates a conventional underground sprinkler assembly (S) housed within an underground casing (3), wherein the sprinkler head (1), secured to a water conduit (2), is raised in an above-ground position for purposes of irrigating the surrounding ground surface (G). Note that the casing (3) is shown in a longitudinal cross section to illustrate the interior. FIG. 2 illustrates the sprinkler head (1) in a lowered position within the casing (3). The casing (3) of this type of underground sprinkler assembly (S) comprises an underground portion (3*a*) that functions to house the sprinkler head assembly and an above-ground or ground level platform (22) portion that is integral with the underground portion of the casing (3*a*) and extends transversely from the open end (4) of the casing. The entire casing, including the platform section, is typically fabricated of the same hard material as the sprinkler head lid (10). Thus, the present invention may also include a second mat (20) that is configured for attachment to the platform (22). Like the mat designed for attachment to the lid, this second mat is fabricated of a material that is less rigid than the underlying platform (22), and more preferably is formed of same shock absorbing material, such as rubber or a rubber composite. In fact, the same shock absorbing materials as described above for the lid mat (10) are preferably employed for the platform mat (20). As shown more clearly in FIGS. 4 and 5, the platform mat (20) has a centrally disposed opening (24) configured to surround the top opening (4) of the casing (3) such that the sprinkler head (1) may be freely raised and lowered through the respective openings (4,24) of the casing (3) and platform mat (20). Moreover, when the sprinkler head (1) is lowered into the inderground casing portion (3*a*), the lid mat (10) is nested within the platform mat opening (24), as shown in FIG. 2 and 4. Thus, when a golf ball strikes the platform mat (20), the ball rebounds off the mat to a lesser degree than if the ball had stricken the hard surface of the platform (22) directly (i.e. without the mat). It will be understood by those of ordinary skill in the art that the present invention may be employed with any conventional underground sprinkler assembly wherein the sprinkler head has secured to it a protective lid, and thus the present invention is not limited to the type of sprinkler assembly illustrated in the figures.

For primarily aesthetic purposes, both mats (10, 20) may include a layer of artificial grass (13, 23) oriented on the upper surfaces (10*a*, 20*a*) of the mats. The artificial grass may be any conventional, flexible plastic grass commonly used on patios and sports fields (especially baseball and football fields) and may be secured to, or incorporated within, the mat itself.

The mats of the present invention may be permanently attached to the sprinkler head lid and/or casing platform by any common means of affixation. An adhesive may be employed, such as a rubber cement or epoxy, for example, to permanently affix the mat(s) to the lid and/or platform. Alternatively, a layer of VELCRO may be permanently affixed to the lower surface of one or both mats as well as the upper surface of the lid and/or platform for subsequent attachment. Other means of temporary or permanent affixation may be employed by those of ordinary skill in the art, including, but not limited to, snaps, clips, clamps, tacks, screws, bolts, and other types of fasteners. FIGS. 1–2 illustrate layers (11, 25) of adhesive or mechanical fixation means (e.g. VELCRO, snaps, etc.) for the lid mat (10) and platform mat (20), respectively.

Figure 6:
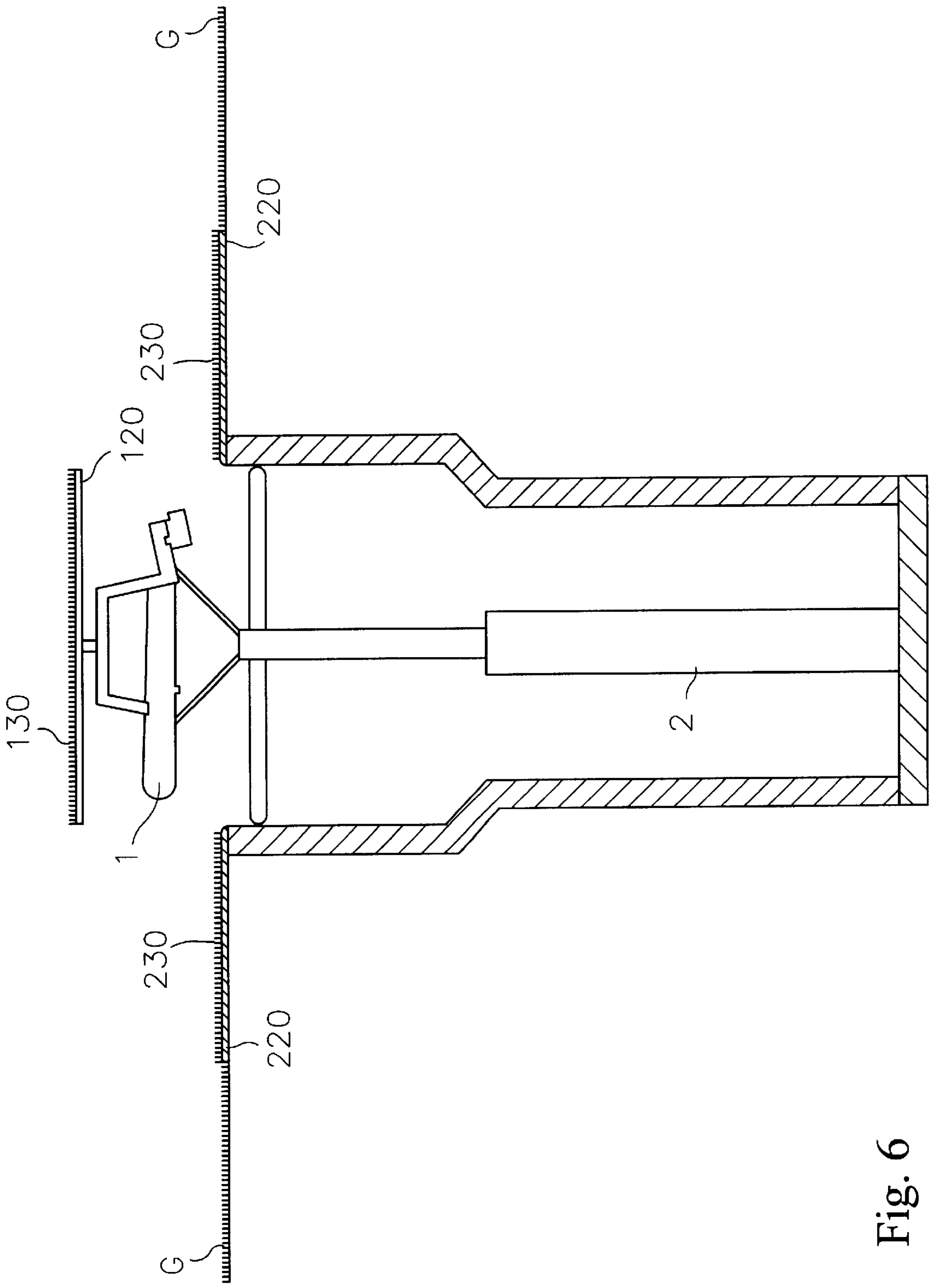
FIG. 6 is a side view of another embodiment of the present invention.

Another aspect of the present invention is to fabricate the sprinkler head lid (12) and/or the casing platform (22) of a less rigid material, preferably a shock absorbing material such as rubber or a rubber composite. FIG. 6 illustrates a conventional underground sprinkler head assembly similar to that shown in FIGS. 1–2, except instead of employing separate mats (10, 20), the lid (120) and platform (220) are fabricated of the same less rigid material thus described above for the lid mat (10) and platform mat (20). A layer of artificial grass (130, 230) may also be disposed upon the top of the lid (120) and platform (220) similar to that described above for the mats (10, 20). The layers of artificial grass (130, 230) may be either secured to, or incorporated within, the lid (120) or platform (220) itself The foregoing disclosure and description of the invention are illustrative and explanatory thereof, and various changes in the size, shape, and materials, as well as in the details of the illustrated construction may be made without departing from the spirit of the invention even though such variations were not specifically discussed above. For example, the mats employed for covering the sprinkler head lid and casing platform are preferably shaped to conform to the shape of the lid and platform, which are typically circular, and also preferably sized to cover the entire upper surfaces of the lid and platform. Alternatively, the mats may be designed to cover less the entire surface of the lid and/or platform or designed to wrap around the lid and/or platform.

What is claimed is:

1. An underground lawn sprinkler assembly, said assembly comprising a. a projectable sprinkler head and a water conduit secured to said sprinkler head, said sprinkler head and conduit housed within a casing designed for underground installation, said casing having an underground portion for housing said sprinkler head and conduit, an open top end through which said sprinkler head may be raised and lowered when in operation, and a platform extending transversely from said open top end of said casing and positioned at ground level upon underground installation of said underground portion of said casing, said platform formed of a rigid material and having an upper surface;

b. a lid secured to said sprinkler head, said lid formed of a rigid material and having an upper surface;

c. a first mat secured to said upper surface of said lid, said mat formed of a uniformly solid layer of shock-absorbing material; and d. a second mat secured to said upper surface of said platform, said second mat having a centrally disposed opening configured to surround said open top end of said casing and within which said first mat is nested when said sprinkler head is in a lower position, wherein said second mat is formed of a uniformly solid layer of shock-absorbing material; and whereby when a ball strikes said first mat, the ball rebounds off said first mat to a lesser degree than if the ball had stricken the lid directly, and whereby when said ball strikes said second mat, the second mat causes the ball to rebound away from said second mat to a lesser degree than if the ball had stricken the platform directly.

2. The assembly of claim 1 wherein said shock-absorbing material is selected from the group of synthetic rubber, synthetic rubber composites, natural rubber, natural rubber composites, PVC foam, polyurethane foam, and other soft plastics.

3. The assembly of claim 1, further including a layer of artificial grass secured to an upper surface of said first mat and a layer of artificial grass secured to an upper surface of said second mat.

4. The assembly of claim 3, wherein said shock absorbing material is selected from the group of synthetic rubber, synthetic rubber composites, natural rubber, natural rubber composites, PVC foam, polyurethane foam, and other soft plastics.

5. A kit for attachment to an underground sprinkler system, said kit comprising:

a first mat formed of a uniformly solid layer of shock absorbing material, said mat having an upper surface and a lower surface and wherein said lower surface is configured to attach to an upper surface of a projectable underground sprinkler head lid; and a second mat for attachment to a ground level or above-ground platform of an underground lawn sprinkler assembly casing, said second mat having a centrally disposed opening configured to surround a top opening of said casing and within which said first mat is nested when the sprinkler head lid is in a lowered position; wherein said second mat is formed of a uniformly solid shock-absorbing material; and whereby when a ball strikes said first mat, the first mat causes the ball to rebound away from said first mat to a lesser degree than if the ball had stricken the lid directly; and whereby when said ball strikes said second mat, the second mat causes the ball to rebound away from said second mat to a lesser degree than if the ball had stricken the platform directly.

6. The kit of claim 5, wherein said shock absorbing material is selected from the group of synthetic rubber, synthetic rubber composites, natural rubber, natural rubber composites, PVC foam, polyurethane foam, and other soft plastics.

7. The kit of claim 6, wherein said first mat further includes a layer of artificial grass attached to said upper surface of said first mat, and wherein said second mat further includes a layer of artificial grass attached to an upper surface of said second mat.

8. The kit of claim 7, wherein said shock absorbing material is selected from the group of synthetic rubber, synthetic rubber composites, natural rubber, natural rubber composites, PVC foam, polyurethane foam, and other soft plastics.

9. A method for minimizing the severity of a ball's subsequent rebound from an underground sprinkler assembly upon striking said assembly, said method comprising:

a. securing a first mat to a lid of a sprinkler head, wherein said lid is formed of a rigid material and said first mat is formed of a uniformly solid shock-absorbing material, such that when said ball strikes said first mat, the first mat causes the ball to rebound away from said first mat to a lesser degree than if the ball had stricken the lid directly; and b. securing a second mat to a ground level or above-ground platform integral with an underground casing for housing the sprinkler head, said second mat having a centrally disposed opening configured to surround a top opening of said casing and within which said first mat is nested when said sprinkler head is in a lowered position, wherein said platform is formed of a rigid material and said second mat is formed of a uniformly solid shock-absorbing material, such that when said ball strikes said second mat, the second mat causes the ball to rebound away from said second mat to a lesser degree than if the ball had stricken the platform directly.

10. The method of claim 9, wherein said ball is selected from the group of golf balls, bocce balls, baseballs, softballs, and croquet balls.

11. The method of claim 10, wherein said sprinkler head is installed on a golf course and said ball is a golf ball.

12. The method of claim 9, wherein said shock absorbing material is selected from the group of synthetic rubber, synthetic rubber composites, natural rubber, natural rubber composites, PVC foam, polyurethane foam, and other soft plastics.

13. the method of claim 12, wherein said ball is selected from group of golf balls, bocce balls, baseballs, softballs, and croquet balls.

14. The method of claim 13, wherein said sprinkler head is installed on a golf course and said ball is a golf ball.

15. The method of claim 9, wherein said first mat includes a layer of artificial grass secured to an upper surface of said first mat and said second mat includes a layer of artificial grass secured to an upper surface of said second mat.

16. The method of claim 12, wherein said first mat includes a layer of artificial grass secured to an upper surface of said first mat and said second mat includes a layer of artificial grass secured to an upper surface of said second mat.

17. The method of claim 15, wherein said ball is selected from group of golf balls, bocce balls, baseballs, softballs, and croquet balls.

18. The method of claim 16, wherein said ball is selected from group of golf balls, bocce balls, baseballs, softballs, and croquet balls.

* * * * *